United States Patent
Sato (10) Patent No.: US 7,540,669 B2
(45) Date of Patent: Jun. 2, 2009

(54) OPTICAL MODULE WITH ELECTRICALLY ISOLATED STEM AND CAP

(75) Inventor: Shunsuke Sato, Kanagawa (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 12/007,990

(22) Filed: Jan. 17, 2008

(65) Prior Publication Data

US 2008/0187272 A1 Aug. 7, 2008

(30) Foreign Application Priority Data

Jan. 18, 2007 (JP) ............................ 2007-008614

(51) Int. Cl.
*G02B 6/36* (2006.01)
(52) U.S. Cl. ........................................................ 385/92
(58) Field of Classification Search .............. 385/88–94
See application file for complete search history.

(56) References Cited

U.S. PATENT DOCUMENTS 7,217,042 B2  5/2007  Okada et al.
2007/0228405 A1* 10/2007 Tateiwa et al. ................ 257/99

\* cited by examiner

*Primary Examiner*—Sarah Song
(74) *Attorney, Agent, or Firm*—Venable LLP; Michael A. Sartori; Steven J. Schwarz (57) ABSTRACT

The present invention provides an optical module with a new stem to reduce the EMI noise and to enhance the ESD tolerance of the optical transceiver. The optical module comprises the stem, a cap and a optical device installed in a space formed by the stem and the cap. The stem includes a center portion that mounts the optical device and a peripheral portion that holds the cap. Between the center portion and the peripheral portion is provided with an insulator to electrical isolate two portions. The case lead directly connected to the center portion and to the circuit board within the transceiver may be fully isolated from the frame ground connected to the sleeve and the peripheral portion.

12 Claims, 7 Drawing Sheets

*Prior Art*

OPTICAL MODULE WITH ELECTRICALLY ISOLATED STEM AND CAP

BACKGROUND OF THE INVENTION

1. Field of the Invention

The present invention relates to an optical module applied to an optical communication and an optical transceiver installing the optical module.

2. Related Prior Art

An optical module, which has a function to convert optical signals into electrical signals, constitutes an optical sub-assembly with optical members such as sleeve to guide an optical ferrule in an optical connector. Such an OSA is installed on an optical receptacle of an optical transceiver that is one of an optical communication device.

Figure 7:
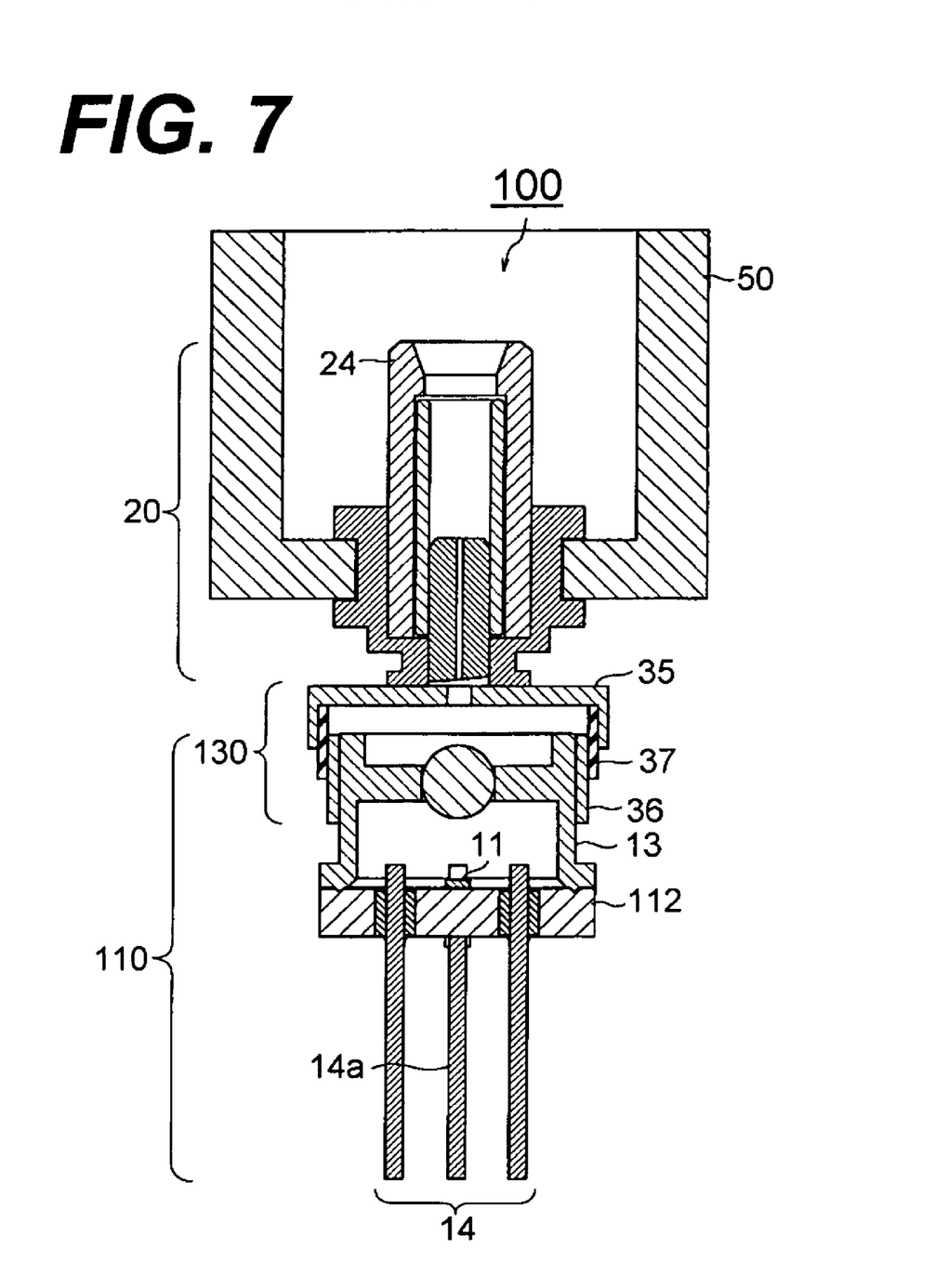
FIG. 7 shows a conventional optical model.

FIG. 7 illustrates an exemplary structure of the conventional optical module and the OSA including this optical module. The optical module 110 includes a stem 112, on which a semiconductor optical device 11 is mounted, a cap 13 with a lens and lead pins 14. This optical module 110 constitutes the OSA 100 with coupling members including a sleeve member 20 to guide the ferrule not shown in FIG. 7 and a joint member 130 to couple the optical module 110 with the sleeve member 20.

The optical receptacle 50 that is electrically conductive and assembles the sleeve member 20 of the OSA 100 is grounded to the frame ground (hereinafter denoted as FG) of the host system that installs the optical transceiver using this OSA 100. Thus, the optical receptacle 50 shows a function of the electrical shield for the semiconductor device 11. The sleeve member 20, at least outer surface thereof, is made of electrically conductive material and also shows the electrically shielding function.

The optical module 110 provides a CAN package constituted S with the cap 13, the stem 112 and a plurality of lead pins 14. One of lead pins 14a is a case lead directly connected to the stem 112. This case lead 14a is connected to the signal ground (hereafter denoted as SG) on the circuit board (not shown in FIG. 7) to secure a stable operation of the semiconductor optical device 11.

When noises occurred outside the equipment come in the electronic equipment, the noises sometimes cause to break the electronic devices installed within the equipments or to make the operation of the circuit instable. In the optical module shown in FIG. 7, because the sleeve member 20 receives to external optical connector and the case lead pin 14a is connected to the circuit board within the optical transceiver, the electronic devices mounted on the circuit board are practically exposed to the external noises, which may break the electronic devices by the ESD (electro-static discharge). In another aspect, the noises occurred within the transceiver due to its operating signal with high frequencies are easily radiated from the sleeve member through the case lead pin 14a, which is often called as the EMI (Electro-Magnetic Interference) noise.

To solve the subjects above, a prior optical module disclosed in the U.S. Pat. No. 7,217,042, has an arrangement where the joint member 130 between the sleeve member 20 and the optical module 110 comprises a metal ceiling 35, a metal ring 36 and an insulating ring interposed between two metal members, 35 and 36. According to this arrangement, the signal ground SG conducted to the case lead pin 14a from the circuit board may be fully isolated from the frame ground FG of the optical receptacle 50 and the sleeve member 20, thus, the EMI noise may be reduced and the ESD tolerance may be enhanced.

SUMMARY OF THE INVENTION

One feature of the optical module of the present invention is to provide a new arrangement of the stem in the optical module, replacing the insulating ring provided in the cap of the prior module, to isolate the signal ground SG from the frame ground to enhance the ESD tolerance and to reduce the EMI noise.

An optical module according to the invention comprises a semiconductor optical device, a stem, a plurality of lead pins, and a metal cap. The semiconductor optical device may be a semiconductor photodiode (PD) and a semiconductor laser diode (LD). The stem includes two portions, a center portion and a peripheral portion, electrically isolated to each other by an insulator. The center portion installs the semiconductor optical device, while, the peripheral portion holds the cap. At least one of lead pins, a case lead pin, is directly connected to the center portion. In the present optical module, the case lead pin may be fully isolated from the cap by the insulator interposed between the center portion and the peripheral portion.

The insulator may be ceramics such as alumina or aluminum nitride. The stem may have a disk shape, that is, the center portion has a disk shape, the insulator may have a ring shape so as to surround the disk shaped center portion, and the peripheral portion may also have a ring shape surrounding the ring-shaped insulator.

Another aspect of the present invention relates to an optical sub-assembly (OSA) installed in an optical transceiver. The OSA comprises the optical module described above, a sleeve member and a joint member. The sleeve member receives an external optical connector with an optical fiber that optically couples with the optical device in the optical module, thus, the sleeve member exposes outside of the optical transceiver to receive the optical connector. The sleeve member is electrically connected to the frame ground of the optical transceiver. The joint member, arranged between the optical module and the sleeve member, optically couples the sleeve member with the optical module and directly connected to the cap of the optical module.

Because the OSA of the present invention has the stem that isolates the signal ground provided on a circuit board, where an electronic circuit of the optical transceiver is mounted, from the frame ground attributed to the housing of the optical transceiver, even if the joint member and the sleeve member are made of electrically conductive material and the sleeve member is directly connected to the housing.

DESCRIPTION OF PREFERRED EMBODIMENTS

Figure 1A:
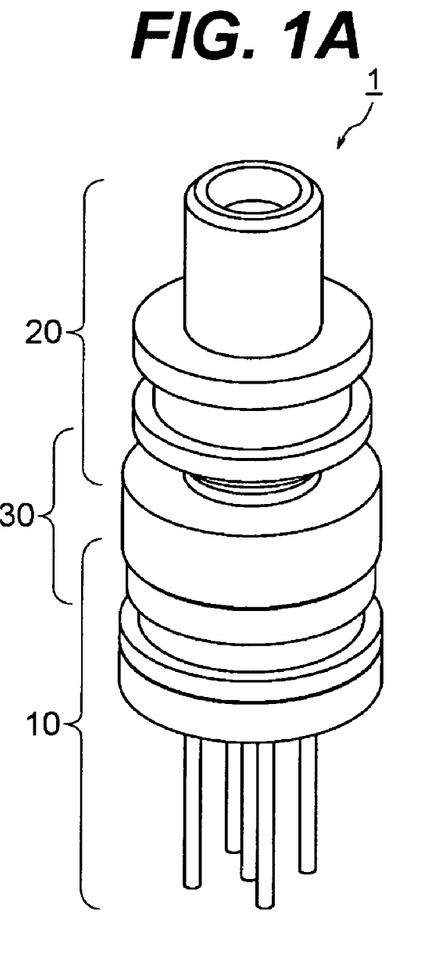
FIG. 1A is an appearance of the optical sub-assembly that installs the optical module according to the present invention.
Figure 1B:
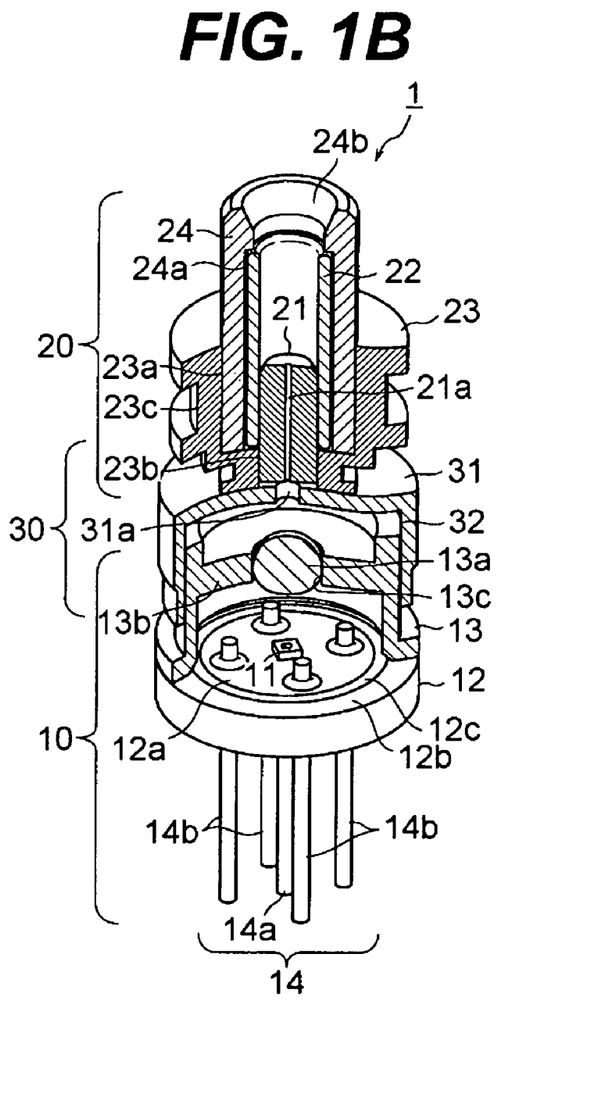
FIG. 1B is a perspective view of the optical sub-assembly, portion of which is broken to show the inside thereof.
Figure 2:
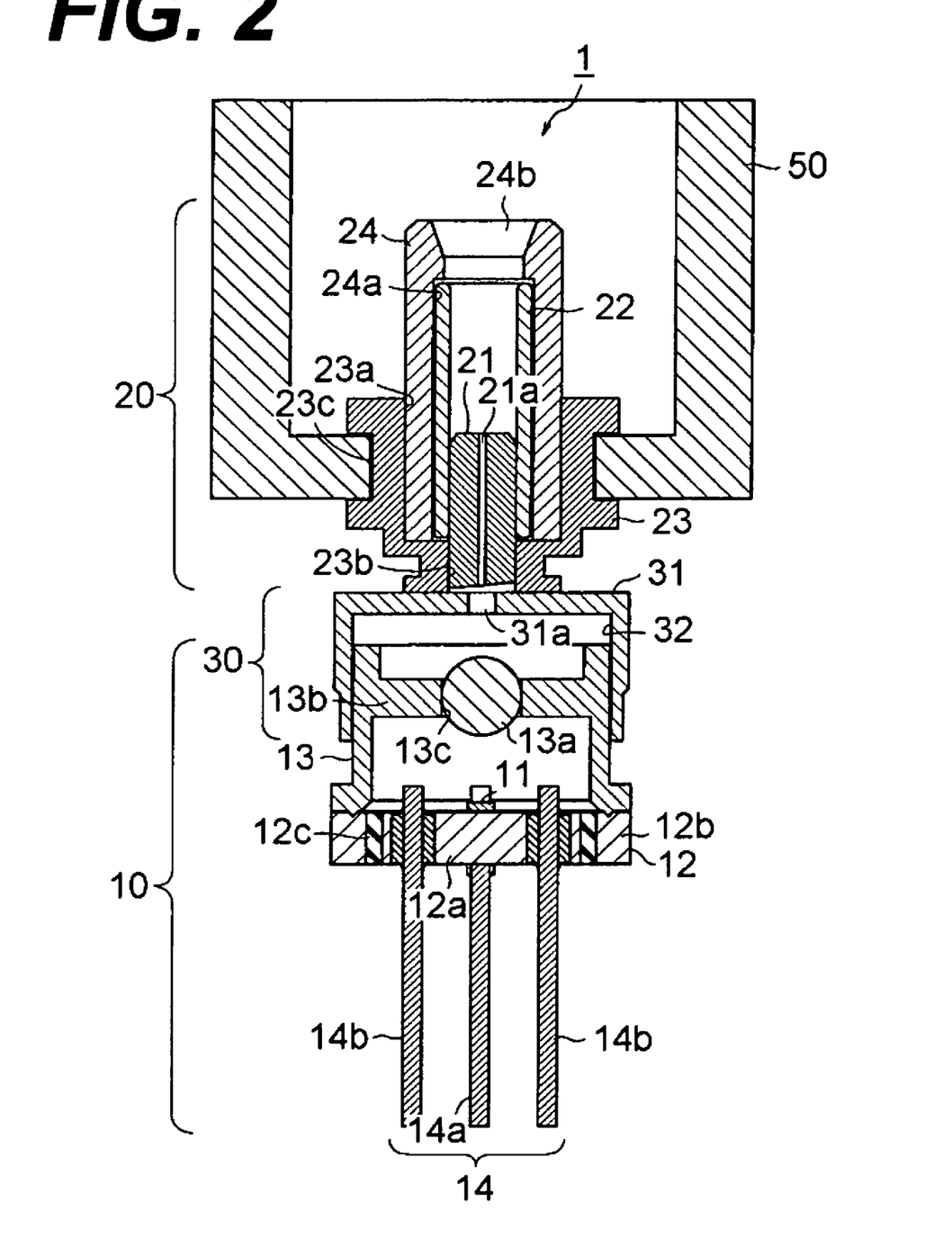
FIG. 2 is a cross section of the optical sub-assembly assembled with the optical receptacle.

Next, preferred embodiments of the optical module according to the present invention will be described as referring to FIGS. 1 and 2. FIG. 1A is an appearance of the optical sub-assembly that installs the optical module according to the present invention, and FIG. 1B is a perspective view of the optical sub-assembly, portion of which is broken to show the inside thereof. FIG. 2 is a cross section of the optical sub-assembly assembled with the optical receptacle. The optical module 10 according to the present invention includes a semiconductor optical device that converts an optical signal to an electrical signal or an electrical signal to an optical signal. The former function may be performed by a semiconductor photodiode (PD), while, the latter function may be performed by a semiconductor laser diode (LD). The embodiment exemplarily describes an optical module that provides a PD, and the receiver optical sub-assembly (ROSA) that installs this module.

The optical module 10 provides a CAN package with a co-axial shape comprised of a stem 12 and a cap 13 to form a cavity where the PD 11 is mounted. The optical module 10 constitutes the ROSA 1 assembled with the sleeve member 20 and the joint member 30. The sleeve member 20 guides an optical ferrule, not shown in figures, while, the joint member 30 connects the sleeve member 20 to the optical module 10. The ROSA 1 may be installed in, for instance, an optical receptacle of an optical transceiver, which receives an optical connector attached to an end of the optical fiber.

First, the sleeve member 20 and the joint member 30 will be described. The sleeve member 20 includes a stub 21, a sleeve 22, a bush 23 and a shell 24. The stub 21, which is made of ceramics, has a cylindrical shape with a coupling fiber 21a in a center thereof. The stub has an end surface facing the optical module 10. This end surface together with the end surface of the coupling fiber 21a is inclined by about 5 to 10 degrees with respect to the optical axis of the coupling fiber 21a. The other end surface of the stub 21 with the coupling fiber 21a has a convex shape so as to make the physical contact with the end of the ferrule.

The sleeve 22 may be a split sleeve made of ceramics such as zirconia, or a metal rigid sleeve without any slit. The sleeve 22 fits the stub 21 in one end thereof, while, it receives the ferrule of the optical connecter in the other end.

The bush 23 may be made of metal to shield the optical receptacle 50 or may be made of resin with a conductive coating on surfaces thereof. The bush 23 may further enhance the shielding effect when it is connected to the frame ground (FG) of the optical transceiver through the optical receptacle 50. The bush 23 provides a first portion 23a to hold the shell 24 and a second portion 23b to hold the stub 21. The first portion 23a has an inner diameter larger than that of the second portion 23b. The shell 24 may be press-fitted in the first portion 23a, while, the stub 21 may be press-fitted in the second portion 23b. The bush 23 may further provide two flanges between which 23c may be mated with the optical receptacle 50 to set the ROSA 30 in the optical transceiver.

The shell 24 may be made of metal in order to perform the electrical shield, the mechanical abrasion and the workability. The shell provides a hollow 24a to receive a whole portion of the sleeve 22 and a tapered opening 24b. The sleeve 22 set with in the hollow 24a of the shell 24 may guide the optical ferrule such that the optical fiber secured in the ferrule may abut against the end of the coupling fiber 21a in the stub 21.

The joint member 30, maybe made of metal, has a cylindrical shape with a ceiling 31 in one end thereof and a bore 32 in the other side. The ceiling 31 with a flat surface provides an aperture 31a through which the light from the coupling fiber 21a passes. The bush 23 is assembled on the flat surface with, for instance, the YAG laser welding. The bore 32 receives the cap 13, which will be described later, and fixes it with the YAG laser welding.

The joint member 30 has a function to optically align the sleeve member 20 with the optical module 10. The coupling fiber 21a may be optically aligned with the PD 11 in the optical module 10 by sliding the bush 23 on the flat surface of the ceiling 31 prior to the fixing of the sleeve member 20 with the joint member 30. Further, the sleeve member 20, in particular the end surface of the coupling fiber 21a may be optically aligned with the PD 11 in the direction parallel to the optical axis, namely, a distance between the PD 11 and the lens 13a, by sliding the joint member 30 on the outer surface of the cap 13 before the welding.

Next, the detail of the optical module 10 will be described. The optical module 10 has a feature that, (1) mounting the PD 11 on the stem 12, (2) extracting the lead pins 14 outward from the stem 12, and (3) hermetically sealing the cavity formed by the stem 12 and the cap 13 where the PD 11. The PD may be an avalanche photodiode (APD) and a PIN photodiode. The stem 12 has a disk shape comprising a center portion 12a, which is made of metal and mounts the PD 11 thereon, a peripheral portion 12b assembling the cap 13, and an insulator 12c interposed between the center portion 12a and the peripheral portion 12b. The center portion 12a may further mount circuit elements such as resistor, capacitor and amplifier to amplify a faint electrical signal generated by the PD 11. These circuit elements including the PD 11 are connected mutually, to the center portion 12a, or to the lead pins 14b with bonding wires.

The cap 13, which may be also made of metal, has a ceiling 13b that holds the lens 13a. The lens 13a is typically ball lens to concentrate light provided from the coupling fiber 21a on the PD 11. The ceiling 13b intersects the optical axis and provides an aperture 13c in a center portion thereof. The lens 13a is fixed within the aperture 13c with a seal glass. The cap 13 together with the stem 12 hermetically seals the PD 11. The end of the cap 13 is fixed to the peripheral portion 12b of the stem 12 with the resistance welding. Thus, the stem 12 and the cap 13 forms the CAN package with a space to mount the devices therein. When the optical module 10 does not equip the lens 13, a window member transparent to the light from the coupling fiber 21a may seal the aperture 13c.

The lead pins 14, made of metal, includes at least one case lead 14a and signal leads 14b. The lead pins 14 are extracted from the center portion 12a to be connected to the circuit board in the optical transceiver. The signal leads 14b provide the bias voltage to the PD 11 and bring out the signal therefrom to the circuit board. In the case of the TOSA (Transmitter Optical Sub-Assembly), the signal leads provide electrical signal and the bias supply to the LD. Between the signal leads 14b and the center portion 12a of the stem is filled with the seal glass to hermetically seal the space the PD is placed. The case lead 14a is directly connected to the center portion 12a, while, connected to the signal ground (SG) on the circuit board, thus, the center portion 12a is grounded to the signal ground SG.

Figure 3A:
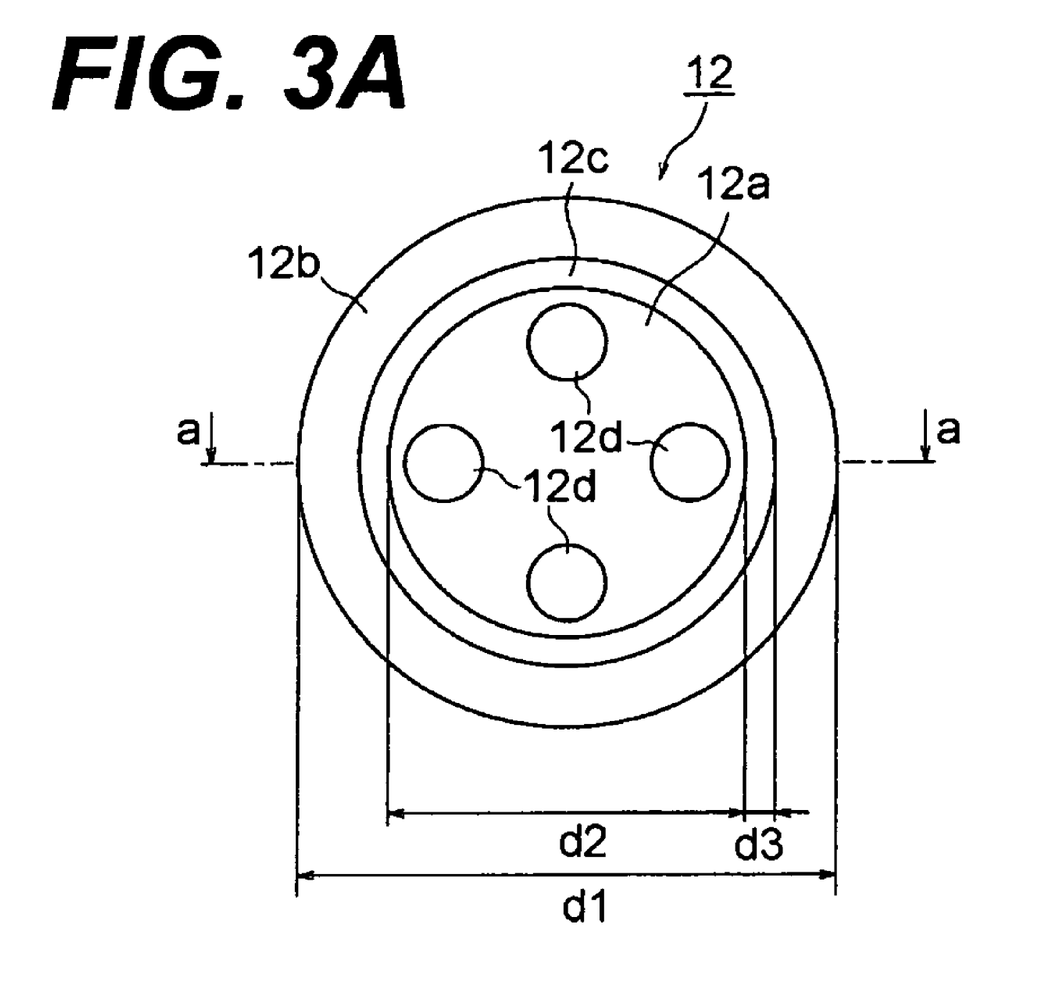
FIG. 3A is a plan view of the stem.
Figure 3B:
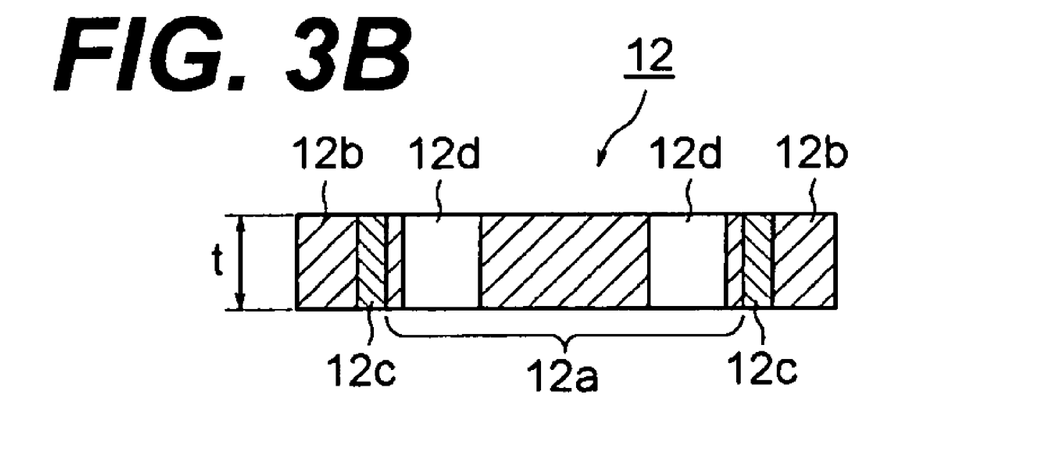
FIG. 3B is a side cross section of the stem.
Figure 4:
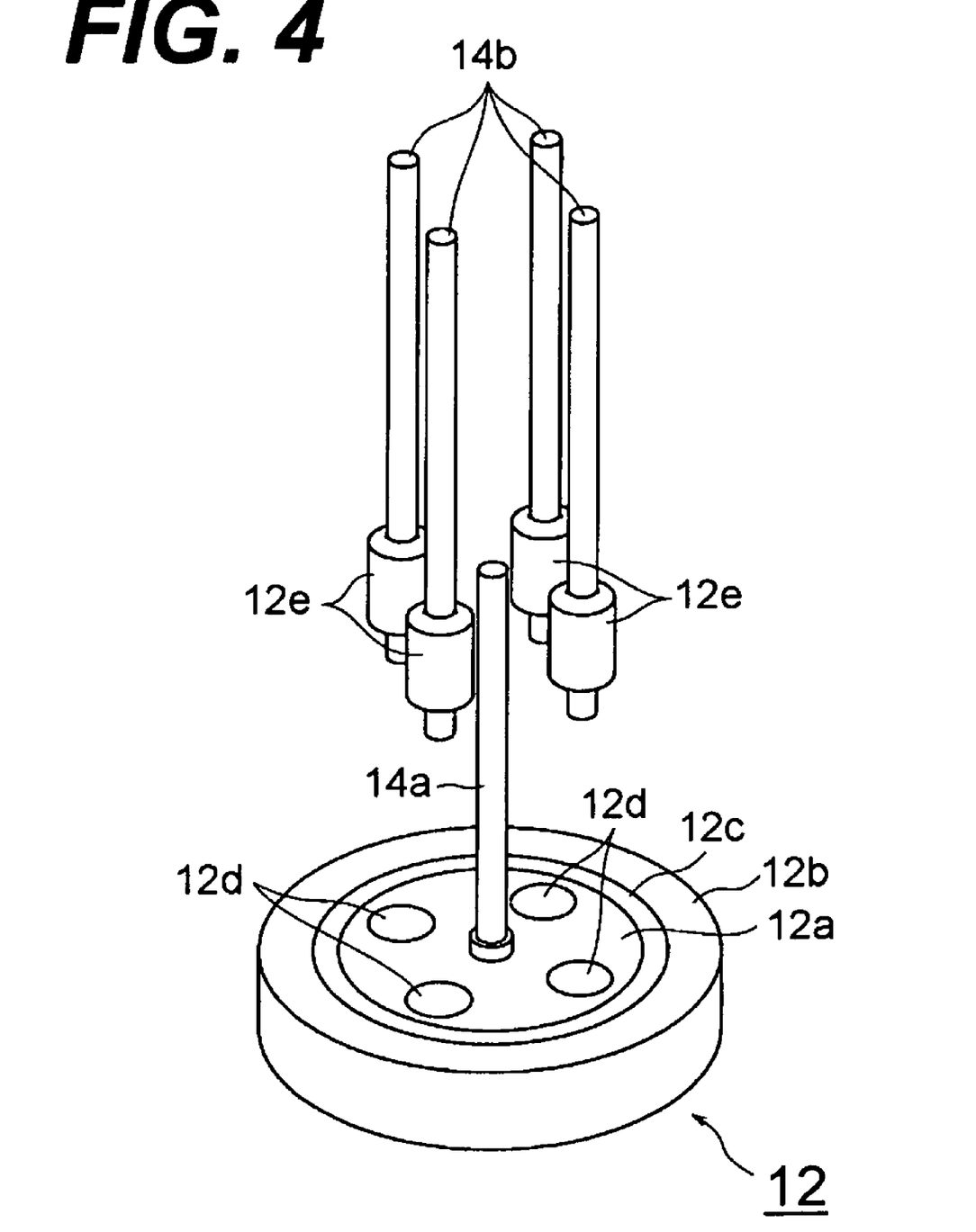
FIG. 4 is an exploded view of the stem, in which the lead pins are assembled therewith.

Next, the stem 12 of the present invention will be described in detail as referring to FIGS. 3 and 4. FIG. 3A is a plan view of the stem 12, while, FIG. 3B is a side cross section of the stem 12 taken along the line a-a in FIG. 3A. The stem 12 shows in figures is required a device-mounting area and a cap-assembling area. The former area corresponds to the center portion 12a, while, the latter area corresponds to the peripheral portion 12c. In order to separate the signal ground SG from the frame ground FG, the present stem interposes the insulator 12c between the center portion 12a and the peripheral portion 12b.

The center portion 12a and the peripheral portion 12b may be made of ferrous material such as cold rolled steel plate or ferrous alloy such as Kovar. The insulator 12c may be made of ceramics such as alumina or aluminum nitride. The stem 12 may have a diameter d1 of 5 mm, the center portion 12a of which has a diameter d2 of 3 mm, and the width d3 of the insulator 12c may be 0.3 mm. The thickness t of the stem 12 may be about 1 mm. The center portion 12a provides a plurality of via holes 12d through which the signal leads 14b pass. As shown in FIG. 4, the center portion 12a welds the case lead 14a by the resistance welding or the brazing. The signal leads 14b, passing through the via holds 12d, are sealed with seal glass 12e so as not to make electrical contact with the center portion 12a. The seal glass 12e enhances not only the electrical isolation but also the air-tightness of the space.

Because the optical module 10 provides the stem 12 mentioned above, the frame ground FG and the signal ground SG can be effectively isolated by the insulator 12c even when the center portion 12a is grounded to the signal ground by the case lead 14a and the peripheral portion 12b is grounded to the frame ground of the optical receptacle 50 through the cap 13 and two members, 20 and 30.

Figure 5:
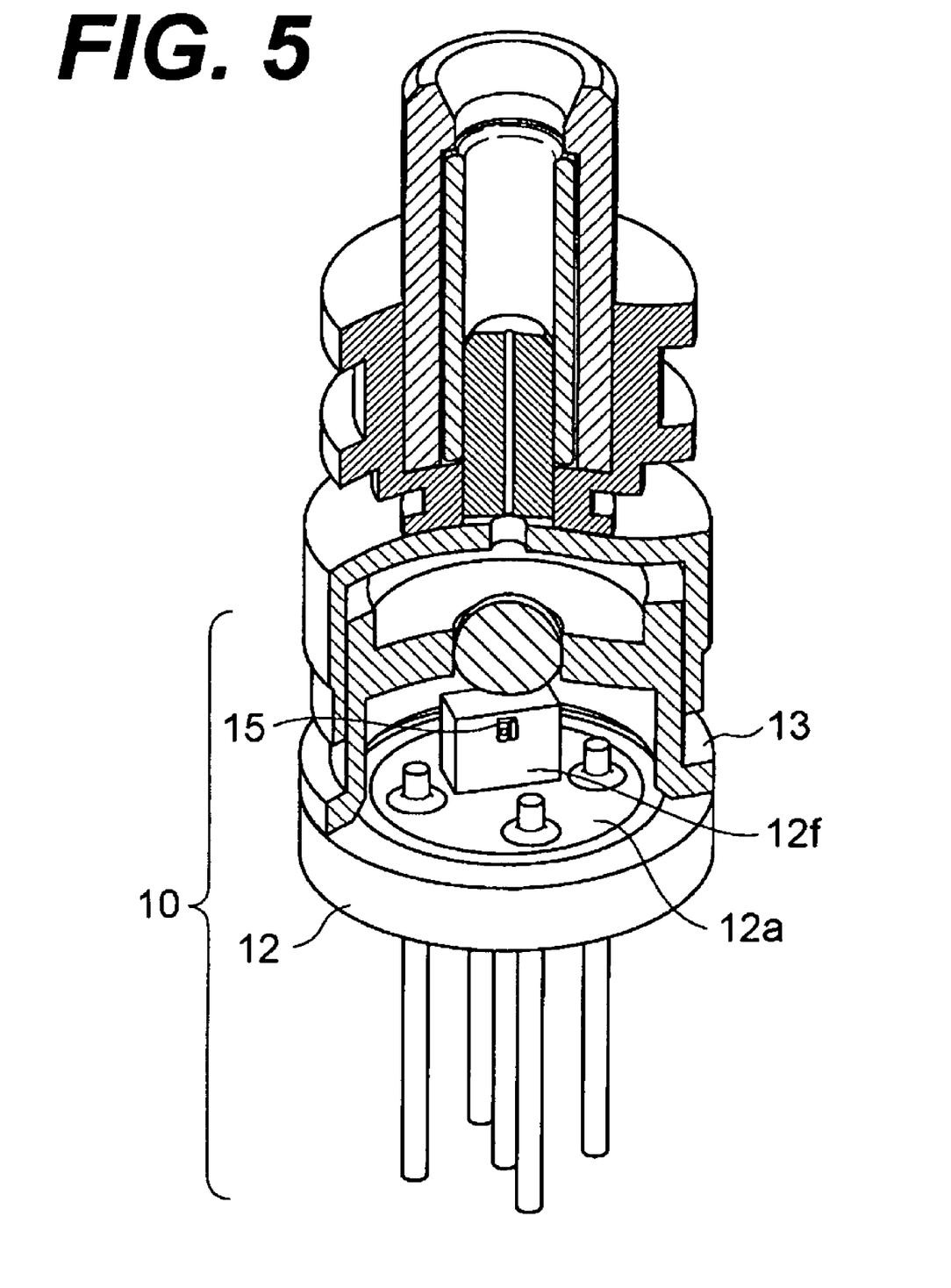
FIG. 5 is a perspective view of the optical module, portion of which is broken to show the inside thereof.

Next, another optical module according to the second embodiment of the present invention will be described as referring to FIG. 5. FIG. 5 is a perspective view of the optical sub-assembly, portion of which is broken to show the inside thereof. This optical module 10 installs a semiconductor laser diode LD 15 as a light-emitting device on a side surface of the sub-mount 12f that is mounted on the center portion 12a of the stem 12.

Because the space formed by the stem 12 and the cap 13 installs sub-mount 12f, the LD with the edge-emitting configuration may be installed within the space. The optical module 10 combined with the sleeve member 20 and the joint member 30 constitutes a transmitter optical sub-assembly (TOSA), which may be also installed within the optical transceiver.

Figure 6A:
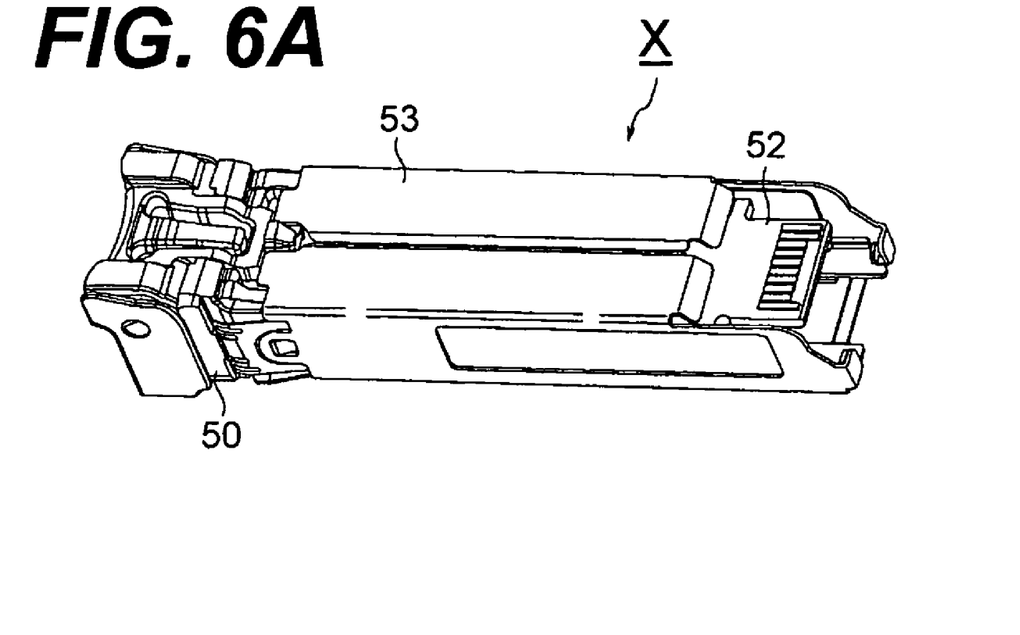
FIG. 6A illustrates the optical transceiver viewed from the bottom and FIG. 6B shows the inside of the optical transceiver.
Figure 6B:
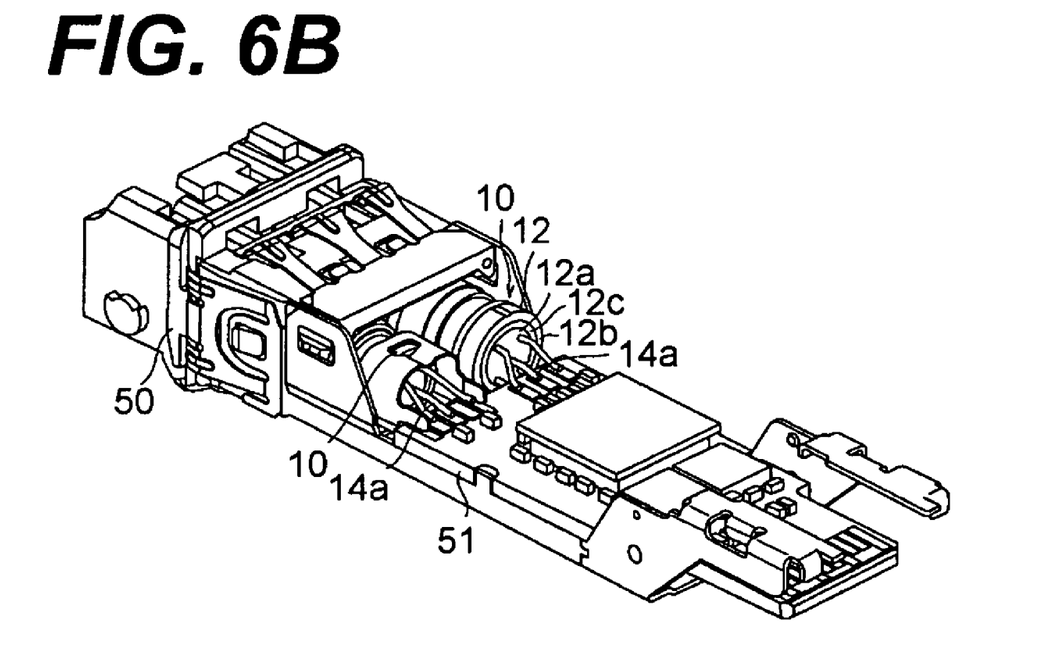

FIG. 6A is an external drawing of such optical transceiver viewed from the bottom side thereof, while FIG. 6B shows an internal arrangement of the transceiver viewed from the top side. The optical transceiver X has a substantially parallel piped structure with the optical receptacle 50 in the front side thereof to receive the optical connector, while, an electrical connector 52 in the rear side to electrically connect the transceiver with the host system. The circuit board 51 connected to the optical modules 10 is installed within the metal housing 53. The circuit board 51 is extended to the rear end to form the electrical connector 52. Thus, the center portion 12a of the stem 12 may be electrically isolated from the peripheral portion 12b and consequently from the metal housing 53 by the insulator 12c.

The ground lead 14a, as shown in FIG. 6B, is directly connected to the center portion 12a of the stem 12 and the signal ground SG on the circuit board 51. However, this signal ground 14a, and the signal ground SG, can be electrically isolated from the metal housing 53 within in the transceiver X. The peripheral portion 12b maybe connected to the metal housing 53 through the optical receptacle 50, in other words, grounded to the frame ground, while, the signal ground SG on the circuit board 51 can be fully electrically isolated from the metal housing, namely, from the frame ground FG.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An optical module, comprising:
   a semiconductor optical device;
   a stem including a center portion, a peripheral portion and a insulator interposed between said center portion and said peripheral portion, said center portion mounting said semiconductor optical device;
   a plurality of lead pins, at least one of lead pins directly and electrically connected to said center portion; and
   a metal cap held in said peripheral portion of said stem, said metal cap and said stem forming a space where said semiconductor optical device is installed,
   wherein said at least one lead pin is fully isolated from said metal cap by said insulator.

2. The optical module according to claim 1, wherein said stem has a disk shape and said metal cap has a cylindrical shape to form a CAN package of said optical module together with said stem.

3. The optical module according to claim 2, wherein said center portion has a disk shape, said insulator has a ring shape surrounding said disk-shaped center portion and said peripheral portion has a ring shape.

4. The optical module according to claim 1, wherein said insulator is made of ceramics.

5. The optical module according to claim 4, wherein said insulator is made of one of alumina and aluminum nitride.

6. An optical sub-assembly installed in an optical transceiver with a housing providing a frame ground and a circuit board providing a signal ground, comprising:
   an optical module including a stem, a cap, a semiconductor optical device, and a plurality of lead pins, said stem comprising a center portion, a peripheral portion and an insulator interposed between said center portion and said peripheral portion, said center portion mounting said semiconductor optical device, said peripheral portion holding said cap, at least one of said lead pins being directly and electrically connected to said center portion in one end thereof and to said signal ground on said circuit board;
   a sleeve member configured to receive an external optical connector with an optical fiber to be optically coupled with said semiconductor optical device, said sleeve member exposing outside of said optical transceiver to receive said optical connector, said sleeve member electrically connected to said frame ground of said housing of said optical transceiver; and
   a joint member arranged between said sleeve member and said optical module to optically couple said optical module with said sleeve member,
   wherein said signal ground is electrically isolated from said frame ground.

7. The optical sub-assembly according to claim 6, wherein said center portion has a disk shape, said insulator has a ring shape surrounding said disk-shaped center portion and said peripheral portion has a ring shape.

8. The optical sub-assembly according to claim 6, wherein said joint member is made of metal and welded to outer surface of said cap, and wherein said sleeve member includes a bush and a sleeve, said sleeve receiving a ferrule of said external connector, at least said bush being configured to be made of metal, to be connected to said housing of said optical transceiver and to be welded to said joint member.

9. The optical sub-assembly according to claim 8, wherein said sleeve is split sleeve made of ceramics.

10. The optical sub-assembly according to claim 8, wherein said sleeve is rigid sleeve made of metal.

11. The optical module according to claim 6, wherein said insulator is made of ceramics.

12. The optical module according to claim 11, wherein said insulator is made of one of alumina and aluminum nitride.

* * * * *